United States Patent [19]

Fedde et al.

[11] 4,314,904

[45] Feb. 9, 1982

[54] ANAEROBIC DIGESTION OF WASTE AND BIOMASS BY USE OF LACTOBACILLUS CULTURE ADDITIVES

[75] Inventors: Paul A. Fedde, Owensboro, Ky.; Sambhunath Ghosh, Homewood, Ill.; Michael P. Henry, Willowbrook, Ill.; Donald L. Klass, Barrington, Ill.

[73] Assignee: Transagra Corporation, Memphis, Tenn.

[21] Appl. No.: 102,924

[22] Filed: Dec. 12, 1979

[51] Int. Cl.$^3$ .............................................. C02F 3/34
[52] U.S. Cl. ................................ 210/611; 210/613
[58] Field of Search ................ 210/11, 603, 606, 610, 210/611, 613, 632; 435/853-857

[56] References Cited

U.S. PATENT DOCUMENTS

| | | | |
|---|---|---|---|
| 3,402,103 | 9/1968 | Amberg et al. | 435/853 X |
| 3,497,359 | 2/1970 | Peer | 435/854 X |
| 3,801,499 | 4/1974 | Luck | 210/11 |
| 3,961,078 | 6/1976 | Stitt | 210/11 X |
| 4,213,857 | 7/1980 | Ishida et al. | 210/611 X |
| 4,214,985 | 7/1980 | Bodenrader | 210/611 |
| 4,237,003 | 12/1980 | El-Sayed | 210/606 |

*Primary Examiner*—Thomas G. Wyse
*Attorney, Agent, or Firm*—Oldham, Oldham, Hudak & Weber Co.

[57] ABSTRACT

An improved digestion process applicable to aerobic and anaerobic digesters is provided for waste treatment facilities during normal and overload conditions. The digestion system utilizes the addition of a lactobacillus fermentation product in a concentration sufficient to improve the digestion of units without deleteriously affecting the digestion system during normal load conditions. In addition, the use of the lactobacillus fermentation product facilitates recovery of digester systems from sour digestion conditions ("stuck digesters") in relatively short periods of time. Further, the ability of the digestion system to operate at higher-than-normal loadings and lower-than-normal detention times permits the use of existing facilities at not only peak periods which would otherwise be subjected to overloadings, but to be able to actually operate a system at twice designed loading, thus allowing for increased digester system capacity without incurring new capital equipment costs.

20 Claims, No Drawings

ANAEROBIC DIGESTION OF WASTE AND BIOMASS BY USE OF LACTOBACILLUS CULTURE ADDITIVES

BACKGROUND OF THE INVENTION

This invention relates to the use of a lactobacillus fermentation product as a microbiological additive to existing anaerobic and/or aerobic digestion systems to improve digestion of wastes and biomass.

Heretofore, the use of lactobacillus microorganisms has been documented for a variety of purposes. For example, U.S. Pat. No. 3,497,359 discloses the incorporation of the lactobacillus bacteria and their metabolic products for use as a livestock feed supplement to promote digestion of foodstuffs by animals. Another use for lactobacillus bacteria in feed for livestock is described in U.S. Pat. No. 3,343,962.

The use of soluble lactic acid fermentation by-products together with inactivated nondesiccated bacillus bacteria, primarily to reduce odor, has been done in the past in a general application, with regard to farm and ranch use, to septic tanks, and to municipal use for the initial treatment of the waste, and was used only in normal load conditions and applied only to the lower levels of areas to be treated.

In recent years, the public has paid great attention to the effects of pollution from an industrial society into the surrounding environment. The treatment of domestic and industrial waste water has been subjected to close scrutiny by the public and regulatory agencies alike. The establishment of standards for municipal and industrial waste water treatment facilities has required substantial changes and additions to the waste water treatment facilities in this country. Continuing inspection and regulation is performed with the purpose of preventing accidents which release untreated waste water into the surrounding fresh water systems.

The rhythm of discharge of waste water into the treatment system is directly dependent upon the operating schedule of the municipality and the industries therewithin. While a regular and constant flow of the waste water would be the optimal situation, the exigencies of different production schedules prevent a uniform flow. Consequently, during peak periods, substantial amounts of waste water may enter a facility the amount of which may exceed the existing capacity for the treatment of the waste and biomass contained within the waste water. Both the primary and secondary digesters are unable to break down the total amount of the waste passing through the treatment system during the peak periods. Therefore, an alternative to building excess capacity in the waste water treatment system to withstand peak period digestion requirements, as well as to allow for a normal expanded load capability of the system, is to provide an additive to the waste water digestion facilities which biochemically creates a greater capacity for waste water treatment than the physical attributes thereof.

SUMMARY OF THE INVENTION

Consequently, it is the object of the invention to provide improved aerobic and/or anaerobic digestion of waste and biomass by increasing the capacity of a waste water treatment facility by an increase in the biochemical capacity of the facilities without a concomitant increase in the physical capacity thereof.

It is another object of the invention to provide improved aerobic and/or anaerobic digestion of waste and biomass in a waste water treatment facility by adding to the existing treatment chemicals an additive which increases the biochemical capacity of the treatment facility.

Yet another object of the invention is to provide an improved aerobic and/or anaerobic digestion system which will not deleteriously affect the chemical or physical properties of the waste water treatment facility when normal loadings of waste are present.

Moreover, it is yet another object of the invention to provide a chemically stable waste water treatment facility for the treatment of waste during peak periods.

A further object of the invention is to provide an improved aerobic and/or anaerobic digestion system for waste and biomass by increasing the capacity of a waste treatment facility by using a biochemical additive of lactobacillus fermentation product in a controlled input, concentration and circulation in the digester.

These and other objects of the invention, which will become apparent as the detailed description of the preferred embodiment proceeds, are achieved by: a method for improving anaerobic digestion of waste and biomass, comprising: (a) producing a lactobacillus culture as a digester additive; and (b) introducing said lactobacillus fermentation product into an anaerobic digester system in a concentration from about 10 to about 1,000 ppm of anaerobic digester volume, so that said lactobacillus additive promotes digestion of the wastes and biomass at a greater-than-normal rate.

DETAILED DESCRIPTION OF THE PREFERRED EMBODIMENT

The waste water input to any treatment facility contains a variety of organic waste generated by human population, biomass generated from the plant population, or combinations thereof. Additionally, where industrial facilities are nearby, organic waste and chemicals generated by those industrial facilities are often mixed with the municipal waste water and require similar waste water treatment. The various organic wastes, biomass, or the various combinations thereof are commonly treated in a facility that includes an anaerobic digestion process which utilizes microorganisms capable of living without free oxygen to convert complex compounds to simple gases and water. The products resulting from an anaerobic digestion process are methane, carbon dioxide, and unreacted digested solids.

Whenever the capacity of the waste water treatment facility utilizing the digestion process is smaller than the loading of wastes in that system, the prevailing microbial population cannot stabilize completely before the waste water or effluent is transferred to the next stage of treatment.

The microorganisms comprising the anaerobic digestion process are fragile and vulnerable to minor variations in the parameters of their environment within the waste treatment facility. If any of these parameters deviates from the optimum standard, the performance of the microorganisms in the digesters immediately falters. Often, the result of an imbalanced system is "a stuck digester" when the microorganisms cease their normal breakdown of waste material. In other words, a stuck digester results when its operation is considerably removed from the norm such as when a substantial amount of gas being generated is not methane; that is, a gas low in methane but high in carbon dioxide.

In order to prevent the effects due to overloaded conditions, a "stuck digester", or to greatly increase the capacity of the digester as up to about four times its normal capacity, the present invention provides a method for inducing the waste water treatment facility to act beyond its existing physical capacity by aiding digestion of the waste and biomass.

Lactobacillus fermentation products have unexpectedly been found to stabilize the digester process during peak load and stuck digester conditions, as well as to increase its treating capacity. The lactobacillus fermentation products are generally introduced into the anaerobic digester system in small concentrations, either by direct addition to the digester, through addition to the waste water prior to entering the digester, or introduced into the digester recycle stream. Most likely, the introduction of the lactobacillus product additive will occur at the point of recirculation, in that accessability and mixing are maximized with such point of addition. For example, in an anaerobic digester having multiple stages, the lactobacillus product additive may be added solely to the first anaerobic stage and not to the second. Alternatively, the product may be added to the second stage and not the first stage in that less degradable material exists in the second stage.

The lactobacillus product additive may be introduced into the anaerobic digester upon a regular schedule to anticipate peak periods regularly occurring, or upon an irregular schedule when a peak period or "stuck digester" unexpectedly occurs. Typically, the additive is mixed into the digester on a daily basis in such concentrations to maintain the desired amount of lactobacillus fermentation product in the digester.

The lactobacillus additive of the present invention can be made in a manner described in either U.S. Pat. Nos. 3,497,359 or 3,343,962, both of which are hereby fully incorporated by reference, including type of culture and mode of preparation thereof.

The concentration of the lactobacillus product additive to be added to the anaerobic digestion process depends upon the characteristics of the individual waste water treatment facility. Typically, the concentration may range from 10 to 1,000 parts by volume of product per one million parts of digester liquid volume. A concentration of from 100 to 500 is desired with about 200 parts per million parts of digester liquid volume being preferred. The lactobacillus product can contain from $10^4$ to $10^9$ nonviable microorganisms per milliliter, depending on production conditions with $10^8$ microorganisms per milliliter being preferred. Insufficient concentrations of the lactobacillus product additive do not achieve the prevention of overloading or stuck digesters, whereas large concentrations of the lactobacillus product additive deleteriously affect the performance of the digestion system during normal loading by depressing the system pH. Therefore, it is important to assess the proper concentration of the lactobacillus product to be added, according to a variety of operating parameters and concentrations of byproducts produced.

In order for the lactobacillus product additive to chemically maximize the anaerobic digestion process, the pH and buffering capacity of the digestion system must be maintained. Further, the volume of gas generated by the anaerobic digestion system must be within the acceptable ranges for a normal operation of a municipal anaerobic digester. Additionally, the content of the gas produced by the anaerobic digestion system must maintain a sufficient concentration of methane gas, thereby indicating proper digestion. The destruction of volatile solids in the waste is tested by a percentage and comparison of the volatile solids existing prior to treatment and remaining after treatment. Also, the temperature, pH and ratio of acidity to alkalinity are variables which affect anaerobic digestion.

Most anaerobic digesters are operated in a temperature range from about 20° C. to about 65° C. with the preferred temperature range being approximately 30°–40° C. for mesophilic digestion and 55°–65° C. for thermophilic digestion. A temperature outside of these ranges will severly reduce the activity of the microorganisms in the digestion process. The reduction in activity requires a concomitant additional digestion time.

Anaerobic digestion requires a pH of the digestion fluids and wastes to be from about 6.4 to about 7.4 with a preferred range of from about 6.8 to about 7.2. In no case should the pH fall below 6.2, in that the production of methane by the microorganisms is inhibited. When the pH is maintained within the optimum range, the microorganisms present maximize digestion and production of the proper byproduct gases and minimize the amount of malodorous compounds remaining. Whenever digestion occurs with a pH below the optimal conditions, the gas generated as a byproduct has a high carbon dioxide content mixed with a variety of organic gases which release foul odors into the atmosphere. Whenever the pH is above the range described above, the microorganisms suitable for an acidic environment are inhibited from digesting in an alkaline environment and the digestion activity is severely reduced.

A test determining the concentration of volatile acids measures the acidic content in the waste water. The acid content typically contains a variety of organic fatty acids, which, if present in large amounts, inhibits the activity of the methane producing bacteria and prevents complete digestion. On the contrary, a measurement of the alkalinity of the waste determines the capacity for the neutralization of the volatile acids produced by the fermentation and degradation of the wastes. If the concentration of the volatile acids when compared with the concentration of the alkalinity levels exceeds a range from about 0.3 to about 0.4, the performance of the digester system is deficient. A volatile acid/alkalinity ratio between 0.5 and 0.8 indicates a serious breakdown of the anaerobic digestion process.

The parameter of total gas production monitors the success of the digestion system through the production of the gas byproducts. The amount of gas generated is directly dependent on the success of the digestion by the anaerobic digestion process. A decrease in the volume of gas produced, per pound of organic waste introduced into digestion, indicates an alteration in the optimal parameters of the digestion process.

Within the total gas production generated, the components of the gas further indicate the type of digestion within the anaerobic digester. The desired component of an anaerobic digestion system is methane, comprising from usually over 50 percent and more normally from about 60 to about 65 percent of the total composition. The other significant component is carbon dioxide in a concentration from about 30 percent to about 35 percent of the total composition of the gas. Other gases comprise the remainder of the composition of the gas produced by the anaerobic digestion. More complete digestion is indicated by higher levels of methane generated, and an increase in the carbon dioxide percentage composition over an extended period of time generally indicates the malfunctioning of the anaerobic digester.

The digestion of volatile solids producing unreactive solids and gas is the purpose of anaerobic digestion. The greater the percentage of destruction of volatile solids, the greater the successful digestion by the anaerobic digester. The processing of these volatile solids more rapidly, and with greater efficiency, permits the anaerobic digester to operate chemically beyond its normal design capacity. It has been found that the addition of lactobacillus fermentation product, in small concentrations to the digesters, unexpectedly can accept organic loading rates up to 0.4 pounds of volatile solids, per cubic foot of digester volume per day, whereas the normal rate is usually 0.05 to 0.15 pounds of volatile solids/ft.$^3$/day. With such additive, any waste water treatment facility not presently capable of digesting such organic loading rates may now accomplish complete digestion without the substantial capital investment of increasing plant physical capacity.

Typically, to increase a 1 MGD digester plant to a 2 MGD digester plant would run about $133,000.00 of new capital investment or an interest cost only on the money of nearly $10,000.00 and a total operating cost of $24,000 to $105,000 depending on the source of digester feed material. In contrast, to increase the 1 MGD plant to a 2 MGD plant with the additive of the invention would require between about 470-2900 gallon per year additive, depending on the type of system, at an equipment cost of about $10,000 or an annual operating cost of between $5,700 and $30,000.

The lactobacillus product additive to the digester is not affected by the operation of the anaerobic digester system in a batch, semi-continuous, or continuous feeding and product removal conditions. The operation of the anaerobic digester, having the lactobacillus product additive therein, maximizes digestive capacity under each of these engineered conditions.

A stuck digester that has effectively ceased digestion may be alleviated by the addition of a lactobacillus product additive having a concentration from about 10 to 1,000 parts by volume per million parts of digester liquid volume. Once the stuck digester begins its recovery, the digester returns to its normal operating capacity, as supplemented by the lactobacillus product additive, for peak period loadings.

The suitability of this method has been tested in both laboratory and full-scale waste water treatment facilities. The synergistic combination of the unexpectedly small concentrations of the lactobacillus product additive with whatever microorganisms already present in the anaerobic digester may be more fully understood by reference to the following examples, which demonstrate the vast improvements to chemical capacity.

EXAMPLE I

A high rate sludge digestion system is fed with a blend of 70 parts by weight of activated sludge solids, and 30 parts by weight of primary sludge solids, and operating at a loading rate of 0.15 pounds of volatile solids per cubic foot of digester capacity per day. The temperature of the digestion system is approximately 35° C., with a detention time of about 12 days. The yield of methane and effluent qualities of the treated sludge comprise the control for further experimentation.

EXAMPLE II

The reaction conditions of Example I are repeated except that approximately 200 parts by volume of lactobacillus fermentation product is added, per million parts of digester liquid volume, and the digester loading rate is increased to 0.3 lb. VS/ft$^3$-day. While the effluent qualities of the digestion system are about the same, the methane yield is twice that of the digester operated according to the conditions of Example I.

EXAMPLE III

The reaction conditions of Example II are duplicated for this experiment, except that no lactobacillus culture additives are added to the digestion system, but the loading rate is maintained at 0.3 lb. VS/ft$^3$-day. When compared with the results of Examples I and II, these reaction conditions produce very poor effluent quality and low methane yields.

EXAMPLE IV

A stuck digester is generated under reaction conditions to simulate inactivity of digestion within the digester. In order to recover from the stuck digester reaction conditions, a total of 180 days is necessary for alleviating the failed conditions.

EXAMPLE V

A stuck digester is generated, according to the parameters of Example IV, except that 1,000 parts by volume of lactobacillus culture additives, per million parts of digester liquid volume are added. The completed recovery of the digester from its failed condition occurs in 30 days.

EXAMPLE VI

A high rate sludge digestion system was loaded at 0.2 pounds volatile solids per cubic foot of digestive capacity per day, detention time was 7 days. The digestion system maintained a steady state for approximately 1 month to 40 days.

EXAMPLE VII

The same digester conditions, as the previous example, were utilized except that the loading rate was increased to 0.4 pounds volatile solids per cubic foot of digester capacity per day and the digester was treated daily with the lactobacillus culture additive at a rate of 200 ppm by volume. A comparison of the test results of these two examples is demonstrated by reference to Table I and Table II, which indicates the comparable performance of the test addition of lactobacillus cultures when the loading rate has been doubled. Comparable statistics are generated between the test and the control and, in some cases, such as total gas yield, the test generated greater results although having twice the loading rate. Further, the test digester had about twice the bicarbonate alkalinity (a measurement of buffer capacity), ammonia nitrogen and filtrate COD than the control digester had. The percentage effluent volatile solids was about the same for both digesters, even though the test digester had twice as much loading rate. Further, the test digester achieved a 5 percent greater reduction in the volatile solids than the control digester.

The result of this comparison indicates that the operating of an anaerobic digester, at twice the normal loading, is possible when the digester system is treated with a lactobacillus fermentation product additive. There is no reduction in the efficiency of the process in other respects. The increased gas production, higher volatile solids reduction, higher bicarbonate alkalinity, without an increase in volatile acid concentration are extremely beneficial to the digester operating at greater-than-normal capacity. The ammonia nitrogen concentration was higher in the additive-digester, indicating a faster rate of protein degradation which improves the efficiency of the anaerobic digester. Therefore, the treatment of the anaerobic digester with unexpectedly small concentrations of lactobacillus fermentation product additives, according to this invention, permits doubling of the digester loading rate with no undesirable alteration of the effluent quality or the process efficiency of the anaerobic digester, in particular, and the overall waste water treatment facility, in general.

TABLE I

SUMMARY OF STEADY-STATE GAS PRODUCTION DATA FOR THE TEST AND THE CONTROL DIGESTERS DURING PHASE XIX WHEN THE FORMER DIGESTER WAS LOADED AT DOUBLE THE RATE OF THE LATTER AT A DETENTION TIME OF ABOUT 7 DAYS

| DIGESTER | MEAN TOTAL GAS YIELD, SCF/lb VS ADDED | MEAN METHANE CONTENT, MOL % | MEAN METHANE YIELD, SCF CH$_4$/lb VS ADDED |
|---|---|---|---|
| Control | 4.71 | 68.0 | 3.20 |
| Test | 5.06 | 67.5 | 3.42 |

TABLE II

SUMMARY OF STEADY-STATE EFFLUENT QUALITY FOR THE TEST AND THE CONTROL DIGESTERS DURING PHASE XIX WHEN THE FORMER DIGESTER WAS LOADED AT DOUBLE THE RATE OF THE LATTER AT A DETENTION TIME OF 7 DAYS

| DIGESTER | MEAN EFFLUENT pH | MEAN VOLATILE SOLIDS REDUCTION, %* | MEAN VOLATILE ACIDS, mg/l AS ACETIC | MEAN BICARBONATE ALKALINITY, mg/l AS CaCO$_3$ | MEAN AMMONIA NITROGEN, ppm as N | MEAN FILTRATE COD, mg/l |
|---|---|---|---|---|---|---|
| Control | 6.94 | 22.2 | 39 | 2,704 | 634 | 419 |
| Test | 7.32 | 27.6 | 30 | 5,720 | 1,088 | 699 |

*VS reduction = $\frac{VS_i - VS_o}{VS_i - (VS_i VS_o)}$ where $VS_i$ = Percent VS in feed solids, decimal equivalent
$VS_o$ = Percent VS in effluent solids, decimal equivalent.

EXAMPLE VIII

An anaerobic digestion system at an operating waste water treatment plant in the United States was tested to demonstrate the operative conditions of the invention in a full scale system. A primary digester was fed with the combined municipal and industrial solids sludge at a volume of 47,600 gallons per feeding load. The desired detention time in the unit was approximately 20 days. The pH level in the primary digester unit remained from about 6.0 to about 7.1 pH during the study. Operating temperature ranged from about 35.3° C. to about 32.7° C. The volatile acid/alkalinity ratio average ranged from about 0.02 to about 0.09. During the study, three phases were conducted, the first phase being the start-up of the digester under the experimental tabulation of operating conditions, the second phase being the staggered introduction of a maximum of 200 ppm of volatile solids/cubic feet days of digester capacity, and the third phase being the reduction in the detention time from 20 days to 10 days, without any lactobacillus fermentation product additions in the "control" digester.

EXAMPLE IX

Another primary digester was operated according to the parameters of the control digester of Example VIII, except that the pH ranged from about 6.7 to about 7.6, and the average operating temperature during Phase I was approximately 34.1° C. Further, the volatile acid/alkalinity ratio averaged 0.14 during Phase I. Similar gas production and percentage composition was generated. During Phase II, the test digester was treated with an initial dosage of 25 milligrams of lactobacillus culture additive per liter, with the additive being incrementally increased to reach a concentration of 200 milligrams per liter within a period of 14 days. When the concentration reached 125 milligrams per liter, the volatile acid/alkalinity ratio began to increase. Therefore, this concentration level was maintained until the ratio decreased. The Phase II was continued until a concentration of 200 milligrams per liter of lactobacillus culture additive was obtained. The detention time was approximately 20 days, and the pH, during Phase II, ranged from approximately 7.1 to about 6.5. While the temperature remained the same as that in Phase I for this test, the gas production slightly increased over Phase I gas production, without a change in composition of the byproduct gas produced.

In Phase III of the experimental tabulation in the test operational digester, the feed rate of volatile solids was doubled. The detention time was approximately 9 days with the pH ranging from approximately 7.4 to 6.5. A seasonal change in the environment appeared as a temperature decrease to approximately 31° C. While the volatile acid/alkalinity ratio doubled during Phase III, the range was within that required for a healthy digester. Comparable levels of gas production and percentage composition occurred during this phase. All other indicators showed the digester with the additive operating at twice the normal throughput, to be performing within otherwise normal conditions for all other parameters. Even more significant and unexpected is the fact that with almost one-half the detention time, the test digester with the additive achieved a 95 percent total volatile solids removed, whereas the controlled digester of the previous example achieved only approximately 82 percent total volatile solids removed.

Table III summarizes the three phases of reaction conditions within the test digester and the control digester. The percentage biodegradable matter remaining is an indication of the significant digestive capacity increase when the lactobacillus culture additives are introduced and the anaerobic digester is experiencing greater than normal loadings, as seen by solids loading for Phase III in the table.

TABLE III

Summary

| | PHASE I Similar | | PHASE II 200 ppm 1Q | | PHASE III 200 ppm 2Q | |
|---|---|---|---|---|---|---|
| | AE 3 | AE 4 | AE 3 | AE 4 | AE 3 | AE 4 |
| Influent Flow (gal) | 54,520 | 51,789 | 55,689 | 56,495 | 121,227 | 65,990 |
| Effluent Flow (gal) | 54,213 | 54,266 | 55,305 | 55,107 | 123,833 | 67,903 |
| Detention Time (days) | 20.3 | 21.3 | 20.2 | 19.7 | 9.1 | 16.9 |
| Volatile Acid-Alkalinity Ratio | 0.14 | 0.02 | 0.07 | 0.05 | 0.15 | 0.09 |
| Influent Total Volatile Solids (lb) | 7,758 | 7,352 | 8,800 | 9,005 | 18,858 | 11,741 |
| Effluent Total Volatile Solids (lb) | 4,114 | 4,547 | 4,938 | 3,875 | 12,467 | 8,299 |
| Total Volatile Solids Removal (percent) | 46.9 | 37.9 | 42.6 | 56.8 | 33.9 | 29.3 |
| Biodegradable Matter Remaining Percent | — | — | — | — | 4.8 | 13.6 |
| Methane Composition (Percent) | 65.7 | 64.9 | 65.9 | 65.8 | 64.1 | 64.8 |
| Carbon Dioxode Composition percent | 33.9 | 34.8 | 33.9 | 34.0 | 35.7 | 34.9 |
| Gas Production (Gas Produced/lb TVS Removed | 19.1 | 19.9 | 22.6 | 10.8 | 15.7 | 18.8 |
| pH Max. | 7.6 | 7.6 | 7.1 | 7.2 | 7.4 | 7.4 |
| Min. | 6.7 | 6.7 | 6.5 | 6.9 | 6.5 | 6.6 |
| Avg. | 7.0 | 7.1 | 6.9 | 7.1 | 6.8 | 6.9 |
| Temperature (°C.) | 34.1 | 35.3 | 34.1 | 34.9 | 31.7 | 32.7 |
| Solids loading (lb. TVS/cu ft) | 0.053 | 0.050 | 0.060 | 0.060 | 0.131 | 0.077 |

Hence, in summary, the use of the additive in the digester appears as if optimum results will be achieved to increase the flow capacity by 100 percent by maintaining approximately 200 gallons of additive per 1,000,000 gallons liquid. The preferred technique for entering the additive is to use a conventional chemical feed pump, and effect a feeding about every 12 hours, with this all being accomplished to utilize the existing internal and external mixing equipment of the sewage treatment facility which in affect provides a relatively uniform mix of the chemical additive throughout the digester. The additive in 55 gallon drums of a water slurry can easily be added through the standard chemical feed pump to affect the degree of mixing required.

We have found that fermentation of the lactobacillus culture is necessary to get the end result product which indicates that the additive may be applicable to aerobic digesters as well, since the culture is partially aerobic in the fermentation procedure, although there is no purposeful injection of oxygen as this seems to inhibit growth of the culture.

Tests of the additive show it to be more effective than activated carbon in alleviating unstable conditions in anaerobic digesters. Further, the additive does not add to the sludge volume as activated carbon does with the attendant increase in disposal costs. The activated charcoal may well work with the additive in an aerobic system.

Operating parameters for aerobic digestion are similar to anaerobic digestion. Both processes operate at mesophillic conditions (20° C. to 45° C.) or thermophillic conditions (45° C. to 65° C.). The aerobic digestion or activated sludge process is designed to reduce volatile solids, produce stable odorless products for disposal, improve sludge dewatering properties, and enhance fertilizer value of residue.

Operating parameters for aerobic digestion are hydraulic retention time of 12 to 22 days, loading, 0.1 to 0.2 pounds VS per ft$^3$-day, oxygen requirement of 20 scfm per 1000 ft$^3$ tank volume, dissolved oxygen of 1 to 2 mg per liter, mixing power of 0.5 to 1.0 horsepower per 1000 ft$^3$ tank volume, and volatile solids reduction of 20 percent to 50 percent.

The effluent quality should be approximately:

| | |
|---|---|
| $NO_3$ | 30 mg/l |
| $PO_4$ | 35 mg/l |
| Soluble BOD | 2 to 50 ppm |

One other way to approach the cost factor in constructing a new digester capacity is that it currently is extimated to cost between $7.50 to $8.00 per cubic foot of new digester capacity. The invention is based upon doubling design plant capacity by utilizing the additive.

While the invention is meant to particularly cover the broad range of lactobacillus bacteria in the fermentation culture stage as comprising the additive, the testing of the strain utilized in the examples presented hereinabove indicates that the predominant strain now is Lactobacillus Bulgaricus which is an enriched and fairly pure organism. Essentially, when referring to the 200 ppm injection quantity being the desired amount to achieve the 100 percent increased digester flow capability, it is broken down to substantially the chemical percentages indicated hereinbelow:

| ADDITIVE ANALYSIS | |
|---|---|
| Crude Protein | not less than 4 percent |
| Crude Fat | not less than 0.2 percent |
| Crude Fiber | not more than 0.2 percent |
| Invert Sugars | not less than 5 percent |
| Total Acid | not less than 12 percent |
| Water | not more than 72 percent |
| Ash | not more than 5 percent |

While a detailed description of the preferred methods for preventing digester breakdown during "stuck digester" and overload conditions, as well as increased digester capacity has been described in detail, it is to be understood that the invention is not limited thereto or thereby. Consequently, for an understanding of the scope of the invention, reference should be made to the following claims.

What is claimed is:

1. A method for improving anaerobic digestion of waste and biomass, comprising:

(a) obtaining a nonviable lactobacillus fermentation product as a secondary anaerobic digester additive;

(b) introducing said lactobacillus fermentation product into an anaerobic digester system in a volume concentration from about 10 to about 1,000 ppm of digester liquid volume so that said digesting system digests the wastes and biomass at a greater-than-normal rate, and (c) maintaining the pH of said digester system from between about 6.4 to about 7.4.

2. A method according to claim 1, wherein the concentration of said nonviable lactobacillus fermentation product introduced is from about $10^4$ to about $10^9$ lactobacillus microorganisms per milliliter.

3. A method according to claim 1, further comprising the step of storing said lactobacillus fermentation product before said introduction into the digester system.

4. A method according to claim 3, wherein said storage combines said lactobacillus fermentation product with external nutrients selected from the group consisting of cobalt carbonate, diammonium phosphate, ferrous lactate and lactic acid.

5. A method according to claim 1, wherein said lactobacillus fermentation product is introduced in a single dose, periodically, or continuously to maintain said concentration in the digestion system.

6. A method according to claim 1, in which said lactobacillus fermentation product is added with fresh feed, recycled feed, or blends thereof.

7. A method according to claim 1, in which the lactobacillus fermentation product is separately added to a digester.

8. A method according to claim 1, in which a single treatment of the lactobacillus fermentation product is supplied to said digester.

9. A method according to claim 1, in which the lactobacillus fermentation product is preheated to the temperature of the digestion system with or without fresh or recycled feed before introduction to said digester.

10. A method according to claim 1, in which the lactobacillus fermentation product is added in high initial concentration to the digester at start-up to bring the concentration of said lactobacillus fermentation product in the digester to the desired level after which the ratio of the fresh feed to additive is adjusted to maintain the desired concentration of said additive in the digester.

11. A method according to claim 1, including operating said digester at a greater than normal rate to a rate of about 4 times the normal operating rate of said digester.

12. A method according to claim 11, wherein said digester temperature ranges from about 20° C. to about 65° C.

13. A method according to claim 12, wherein said operating rate of said digester ranges from about 0.15 pounds to about 0.4 pounds of volatile solids per cubic foot of digester volume per day.

14. A method according to claim 13, including periodically adding an amount of said nonviable lactobacillus fermentation product to maintain said lactobacillus concentration in said digester.

15. A method according to claim 13, wherein the amount of said nonviable lactobacillus fermentation product added ranges from about 100 to about 500 parts per million of digester volume.

16. A method according to claim 15, wherein the concentration of said nonviable lactobacillus fermentation product in said digester is about 200 parts per million of digester volume.

17. A method for improving anaerobic digestion of waste and biomass, comprising:

(a) producing a nonviable lactobacillus culture as a secondary digester additive, (b) introducing said lactobacillus culture into an anaerobic digester system in a volume concentration from about 10 to about 1,000 ppm of anaerobic digester volume so that said lactobacillus culture additive digests the wastes and biomass at a greater-than-normal rate, and, (c) maintaining the pH of said digester system from between about 6.4 to about 7.4.

18. A method according to claim 17, wherein the concentration of said nonviable lactobacillus fermentation culture ranges from about $10^4$ to about $10^9$ lactobacillus microorganisms per milliliter.

19. A method according to claim 17, including operating said digester at a greater than normal rate to a rate of about 4 times the normal operating rate of said digester.

20. A method according to claim 19, wherein the amount of said nonviable lactobacillus fermentation product added ranges from about 100 to about 500 parts per million of digester volume.

* * * * *

UNITED STATES PATENT OFFICE
CERTIFICATE OF CORRECTION

Patent No. 4,314,904  Dated February 9, 1982

Inventor(s) Paul A. Fedde, et al

It is certified that error appears in the above-identified patent and that said Letters Patent are hereby corrected as shown below:

Column 10, immediately following the table, approximately line 57, insert the following:

--Nonviable lactobacillus cells not less than $1 \times 10^7$ per ml.--

Signed and Sealed this

Thirty-first Day of May 1983

[SEAL]

Attest:

DONALD J. QUIGG

Attesting Officer  Acting Commissioner of Patents and Trademarks